United States Patent [19]
Kopp

[11] Patent Number: 5,683,544
[45] Date of Patent: Nov. 4, 1997

[54] ADHESIVE FOAM GUN

[76] Inventor: Volker Kopp, Säntisstrasse 29, CH-8133 Esslingen, Switzerland

[21] Appl. No.: 420,374

[22] Filed: Apr. 7, 1995

[30] Foreign Application Priority Data

Apr. 9, 1994 [DE] Germany .................. 44 12 282.9

[51] Int. Cl.⁶ .................................................. B65C 11/04
[52] U.S. Cl. .................. 156/578; 222/518; 222/564; 222/569; 222/570; 222/547; 239/375; 239/525
[58] Field of Search .................. 156/578; 222/518, 222/149, 145.2, 564, 566, 569, 570, 547, 548, 549; 239/375, 525, 526

[56] References Cited

U.S. PATENT DOCUMENTS

| | | | |
|---|---|---|---|
| 1,868,518 | 7/1932 | Breuer | 239/375 |
| 2,887,274 | 5/1959 | Swenson | 239/375 |
| 2,888,207 | 5/1959 | Sykes | 239/375 |
| 3,558,051 | 1/1971 | Strickler et al. | 222/145.1 X |
| 4,519,545 | 5/1985 | Kuminecz et al. | 239/288 |
| 4,534,449 | 8/1985 | Larson | 184/105.2 |
| 4,688,702 | 8/1987 | Yeames | 222/145 |
| 4,807,586 | 2/1989 | Kao | 124/73 |
| 5,271,537 | 12/1993 | Johnson | 222/509 |

*Primary Examiner*—Christopher Kim

[57] ABSTRACT

There are adhesive foams that are formulated for gun uses and adhesive foams that are formulated for adapter use. This means a double track in production, storage and use of adapter foams. The invention is a gun version that permits use of adhesive foams such as used in the adapter version. For this purpose, the needle and the nozzle tube in the gun have a shape such that the nozzle tube has at least one mixing path, and the amount of foam can be sensitively metered by means of narrowings and widenings between the inner wall of the nozzle tube and the outer wall of the needle.

19 Claims, 2 Drawing Sheets

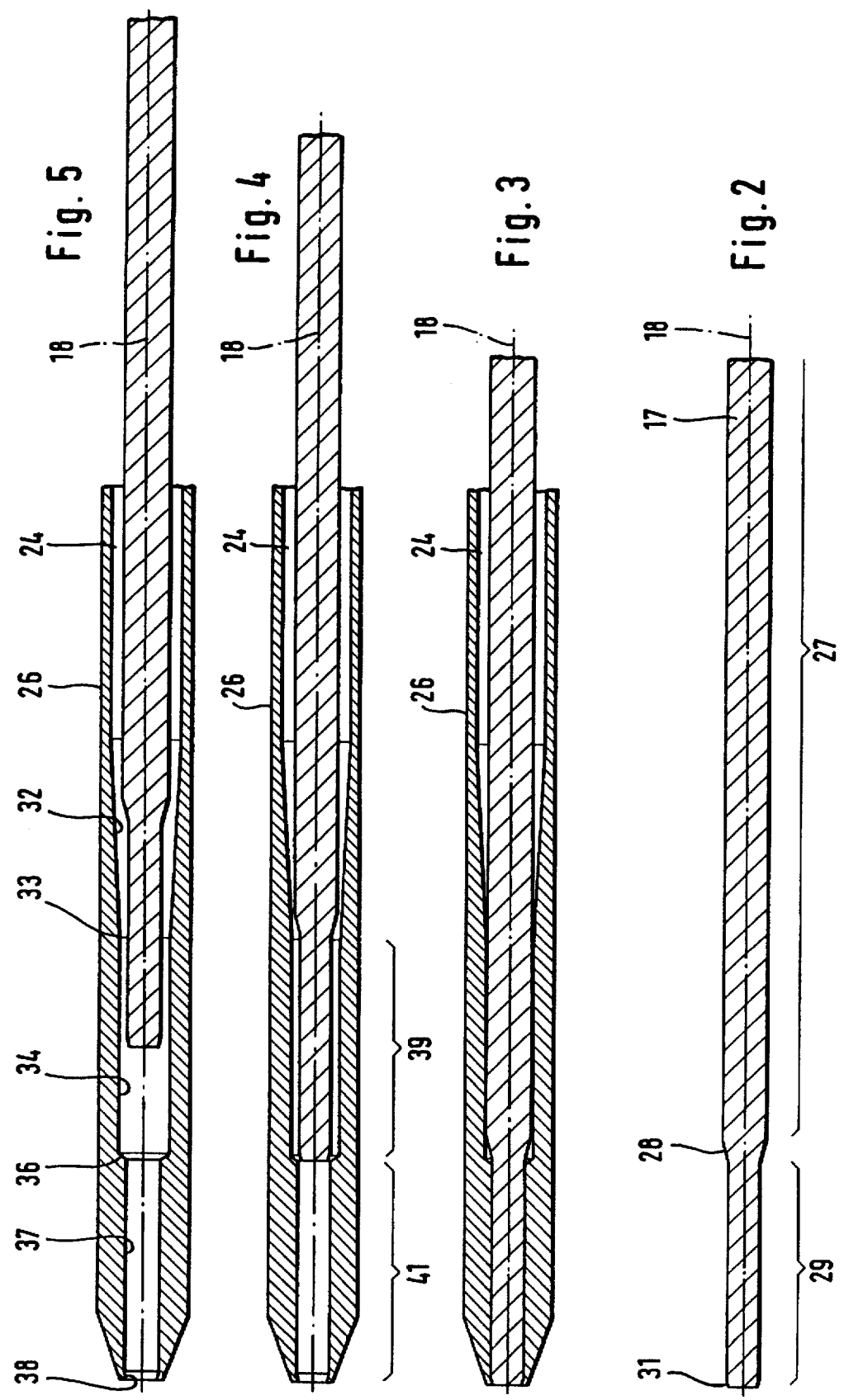

ADHESIVE FOAM GUN

BACKGROUND OF THE INVENTION

1. Field of the Invention

The invention relates to a gun for producing adhesive foam.

2. Relevant Prior Art

Such an appliance is known from the Pageris System adhesive gun, which is the property of the inventor's assignee, and which is used for the production of polyurethane adhesive foam. In such guns, an adhesive foam can is screwed onto the gun adapter. A discharge lever is then pulled. A nozzle needle is then pulled inward within the nozzle tube, and the foam emerges from the nozzle. The pressure difference between the contents of the can and the surroundings is 2–12 bar. The pressure difference gradually falls as far as the nozzle, and then abruptly falls to zero in the surroundings. The foams must be sufficiently fine-celled. It is known from experience which substance must be filled into the cans so that the correct foam ultimately arises, and moreover without a mixing path and a reaction path.

It is furthermore known, for example from German Patent Application P 4 313 319.3, to produce such adhesive foams. As regards apparatus, a so-called angle adapter is clipped onto a pressurized can, and has a long mixing and reaction path in the form of a plastic tube. Since a mixing and reaction path is present here, the content of the can is different from that in the cans used for guns. In addition, the ingredient for known gun foams is more expensive, dearer, and much more critical than those which are used for adapter foams.

Thus, two different can contents have to be produced for gun use and adapter use, and a doubled storage arrangement is necessary. The two different tracks that are necessary in the formulation of the foam prevent the possible use of certain materials which are per se desirable and which, in particular, are environment-friendly.

SUMMARY OF THE INVENTION

The invention has as its object to provide a gun, of the kind mentioned at the beginning, which makes possible the use of the same foams, both for adapters and also for guns.

Furthermore it is an object, with the same foam, to change the foam quality, i.e., to produce foams which have finer cells or coarser cells.

According to the invention, these objects are achieved by a gun for the production of adhesive foam that has a discharge lever, a nozzle tube, a nozzle needle in and coaxial with the nozzle tube, and urging means that press the nozzle needle into a closing position in the nozzle tube. A coupling device is connected between the discharge lever and the nozzle needle, by means of which coupling a given position of the discharge lever corresponds to a given position of the nozzle needle. An at least liquid-tight, conical seat is provided between an end region of the nozzle needle and an end region of the nozzle tube when the discharge lever is not actuated. A cavity is provided between the nozzle needle and the nozzle tube. The nozzle tube has an inner wall and the nozzle needle has an outer surface providing a mixing and reaction path there between upstream of the conical seat, and a narrowing space upstream of the mixing and reaction path and down-stream of the cavity, with a cross section that decreases in a direction towards the conical seat.

DESCRIPTION OF THE DRAWINGS

A preferred embodiment of the invention will now be described, with reference to the drawings, in which:

FIG. 2 shows a longitudinal section through a broken-out nozzle needle, enlarged to double the scale of FIG. 1.

FIG. 3 shows a longitudinal section through the nozzle needle and the nozzle tube in their forward region, in the closed state when a discharge lever is not pulled.

FIG. 4 shows a section like FIG. 3, but with the discharge lever partially pulled.

FIG. 5 shows a section like FIG. 4, but with the discharge lever fully pulled.

DETAILED DESCRIPTION OF A PREFERRED EMBODIMENT

Figure 1:
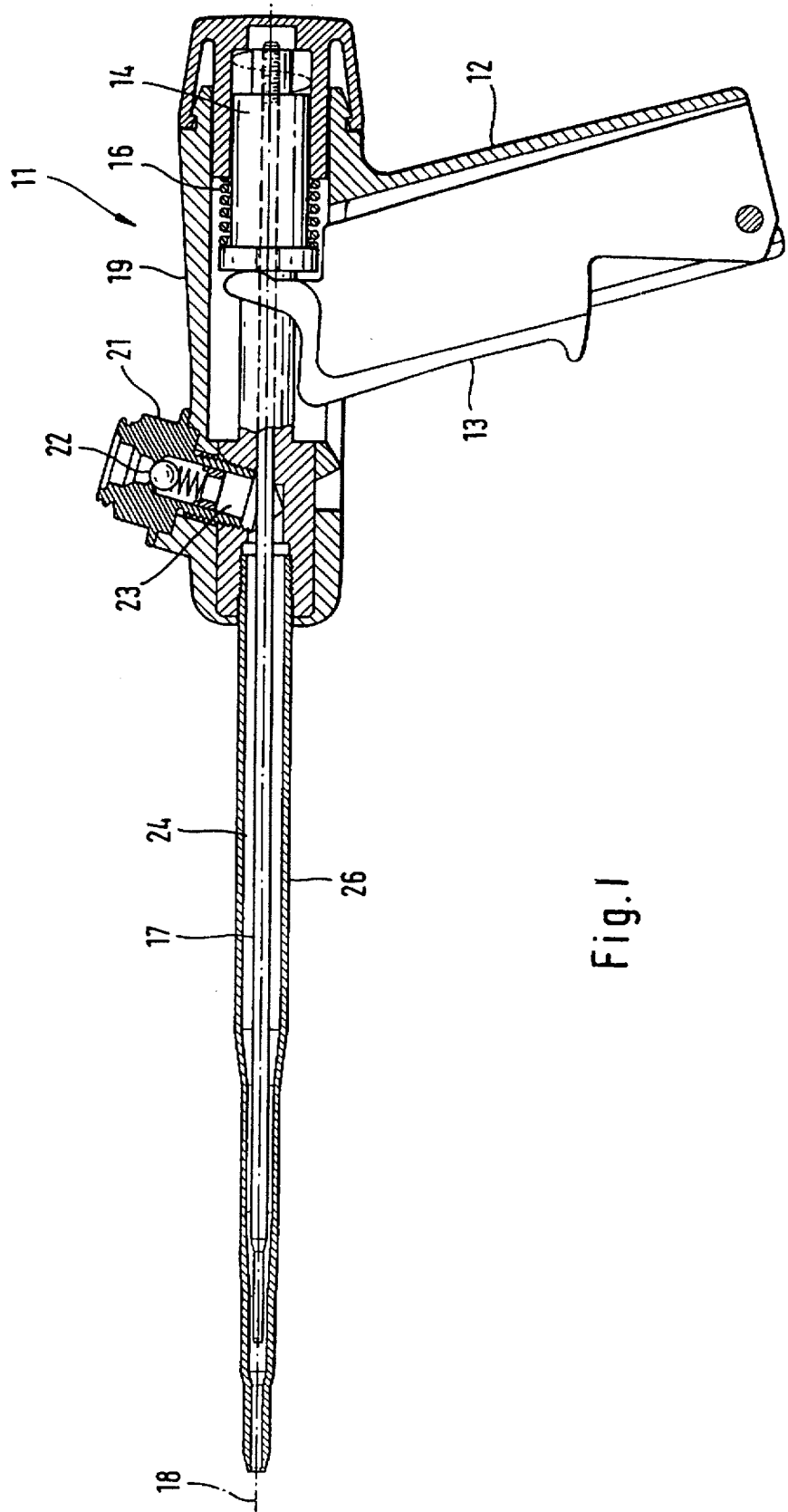
FIG. 1 shows a schematic, partial longitudinal section of a gun.

A gun 11 has a handle 12 with a discharge lever 13, which is fully pulled in FIG. 1. This lever acts on a spring bushing 14, which is shown in the rear position and which is pressed to the left into the closing position by a coil spring 16, absent actuation of the discharge lever 13. A needle 17 is connected rigidly, as regards movement, to the spring bushing 14, and is coaxial with a geometrical longitudinal axis 18, with which the spring bushing 14 and the coil spring 16 are also coaxial. An adapter 21 is provided on the body 19 of the gun, and a foam can (not shown) e.g. according to German Patent Application P 4 343 833.0, can be screwed onto it. With a foam can screwed on, a valve ball 22 is pressed inward against a spring force, and from the can the liquid, as yet unfoamed, reaches a cavity 23. The needle 17 traverses the cavity 23 from below. To the right, and not illustrated, there is located a gas-tight seal between the body 19 and the periphery of the needle 17. The cavity 23 further extends towards the left through an annular space 24 which is coaxial with the geometrical longitudinal axis 18, and which is gas-tightly bounded towards the exterior by a nozzle tube 26, which is connected on the body 19 gas-tightly and rigidly on the right and also open towards the right. Even when the discharge lever 13 is fully pulled, the pressure drop from the entry of the cavity 23 as far as its outlet, and from the right-hand inlet of the annular space 24 as far as its left-hand end, is negligibly small, because the flow resistance in this region is likewise small.

The needle 17 has in the right-hand region 27 in FIG. 2 a constant circular cylindrical diameter of 4 mm. There then follows a coaxial tapering cone 28 which extends over the comparatively short length of 2 mm, and after which the diameter of the needle 17 is reduced from 4 mm to 3 mm. This region 29 is about 2 cm long and is turned and ground to a circular cylinder. Adjoining it is a very acute cone 31, which is turned and ground. This is about 0.5 mm long, and is thus substantially shorter than in the known nozzle needles.

The dimensions given above are only dimensions of a preferred embodiment. They can vary. In particular, the 4 mm stated above can change by ±50%, and also the 2 cm stated above can change by ±50%. Finally, the 0.5 mm can likewise change by ±50%.

A narrowing cone 32 begins in the nozzle tube 26 after the annular space 24; it is coaxial with the geometrical longitudinal axis 18, has a smooth, circular conical shape, and extends at a very acute angle of about 3°. Corresponding to this, the wall thickness of the nozzle tube 26 increases towards the left. The narrowing cone 32 is about 1.7 cm long. From its end 33, there extends to the left a coaxial circular cylindrical bore 34. The bore 34 has throughout a constant diameter of 4.5 mm; it is 1.9 cm long, and ends at the left in a very short taper cone 36. The circular cylindrical coaxial bore 37 adjoining thereto has a diameter of 3 mm, is 1.9 cm long, and thus substantially the same length as the bore 34, and ends at the left with a further short coaxial tapering cone 38. As shown in the drawing, the wall thickness of the nozzle tube 26 always increases towards the left because of the stepwise narrowings.

The purpose of the different shapes can be gathered from a comparison of FIGS. 3, 4 and 5. According to FIG. 3, the nozzle tube 26 is closed, because the 15° cone 31 is seated in the tapering cone 38 and seals it gas-tightly, and because the region 29 is seated in the bore 37 with a tight clearance fit and provides a kind of pre-seal; mainly, however, the bore 37 supports the thin end of the nozzle needle.

In the state according to FIG. 4, the tapering cone 28 comes into the narrowest region of the narrowing cone 32 and allows a little foam to reach a mixing path 39 of small volume, which foam—although still in liquid form—can go past the 15° cone 31 and the tapering cone 36 into the mixing path 41 and can expand there practically completely.

According to FIG. 5, the needle 17 is almost completely, but not yet fully, pulled to the right. The liquid, conducted through the tapering cone 32, comes from the annular space 24 and past the tapering cone 28, which is now quite far to the right, into the mixing path 39, half of which is quite free, and in which the liquid can expand; the liquid then has available for further expansion the completely free mixing path 41, which is however somewhat smaller in diameter.

The further the needle 17 is pulled to the right, the more the foamable liquid flows out of the annular space 24 to the left and also the more of the mixing path 39 and 41 is available to it.

Many variants of the invention are possible. The diameter of the needle 17 can also be between 3 and 6 mm, with corresponding adjustment of other dimensions.

I claim:

1. A gun for the production of adhesive foams, comprising:

a discharge lever, a nozzle tube having an end region, a nozzle needle in and coaxial with said nozzle tube and having an end region with a cone, urging means for urging said nozzle needle into a closing position in said nozzle tube, coupling means for coupling said discharge lever and said nozzle needle, by means of which coupling a given position of said discharge lever corresponds to a given position of said nozzle needle, means for providing an at least liquid-tight, conical seat between said end region of said nozzle needle and said end region of said nozzle tube when said discharge lever is not actuated, a cavity between said nozzle needle and said nozzle tube, said nozzle tube having three coaxial, circular cylindrical bores including said cavity, the diameters of said three coaxial, circular cylindrical bores successively decreasing in size in a down-stream direction towards said end region of said nozzle tube, said nozzle tube having a narrowing tapered cone between a first bore and a second bore of said three coaxial, circular cylindrical bores, and a narrowing tapered cone between said second bore and a third bore of said three coaxial, circular cylindrical bores, said nozzle needle having a first circular, cylindrical region adjacent said end region of said nozzle needle, said first circular, cylindrical region being seated in said third bore of said three coaxial circular, cylindrical bores in said closing position with very small play when said discharge lever is not actuated, said nozzle needle having a cone and a second circular, cylindrical region up-stream of said first circular, cylindrical region, at least part of said second circular, cylindrical region being seated in said closing position in said second coaxial, circular, cylindrical bore when said discharge lever is not actuated, said nozzle needle forming a mixing and reaction path with said nozzle tube with a cross-section that decreases successively in said down-stream direction for generating adhesive foams upon actuation of said discharge lever.

2. Gun according to claim 1, wherein said mixing and reaction path includes first and second partial paths, of which said first partial path is upstream of said conical seat and has a smaller cross section than said second partial path, and said second partial path follows said first partial path and is adjoined thereto.

3. Gun according to claim 2, wherein said first and second partial paths have circular cylindrical cross sections.

4. Gun according to claim 2, wherein said nozzle needle has an end region that is arranged to be moved at least into said second partial path.

5. Gun according to claim 2, wherein said first and second partial paths have cross sections in proportions of 1:2.25±80% to each other.

6. Gun according to claim 3, wherein said second partial path has a diameter providing wide play with respect to said nozzle needle, when said nozzle needle is in said closing position.

7. Gun according to claim 1, wherein said nozzle needle has at least first and second regions having different diameters, said first region having a smaller diameter than said second region and a length that corresponds to said first partial path.

8. Gun according to claim 2, wherein said conical seat means includes a seat portion at said end region of said nozzle needle that is arranged to be pulled back at least partially into said second partial path.

9. Gun according to claim 2, wherein said first partial path has a length of 2 cm ±50%.

10. Gun according to claim 2, wherein said second partial path has a length of 1 cm ±50%.

11. Gun according to claim 1, wherein said second partial path has a length of 2 cm ±50%.

12. Gun according to claim 2, wherein said nozzle needle has, on a length corresponding to said first partial path, a first circular cylindrical section that merges after a short, conical shoulder into a second circular cylindrical section of greater length and diameter than said first section.

13. Gun according to claim 2, wherein said nozzle tube has in a region of said first partial path a first, circular cylindrical section that extends downstream as far as said conical seat.

14. Gun according to claim 2, wherein said nozzle tube has, in a region of said second partial path, a second, circular cylindrical section arranged upstream of said first partial path and having a greater diameter than said first partial path.

15. Gun according to claim 13, wherein said first section has a diameter of 3 mm ±50%.

16. Gun according to claim 15, wherein said second section has a diameter of 4.5 mm ±50%.

17. Gun according to claim 14, wherein said inner tube wall has a progressively decreasing diameter, provided upstream of said second partial path and provides an outer boundary of said narrowing space in said nozzle tube.

18. Gun according to claim 17, wherein said inner tube wall forms a circular cone with a very acute angle.

19. Gun according to claim 1, wherein said discharge lever has a stroke that corresponds to movement of said nozzle needle of 2 cm ±50%.

* * * * *